(12) United States Patent  
Tsiarkezos

(10) Patent No.: US 11,661,701 B2  
(45) Date of Patent: May 30, 2023

(54) DEEP SUBLIMATION DYEING OF FIBROUS COMPOSITES

(71) Applicant: ENGINEERED FLOORS LLC, Dalton, GA (US)

(72) Inventor: Stephen Tsiarkezos, Elkton, MD (US)

(73) Assignee: ENGINEERED FLOORS LLC, Dalton, GA (US)

( * ) Notice: Subject to any disclaimer, the term of this patent is extended or adjusted under 35 U.S.C. 154(b) by 275 days.

(21) Appl. No.: 16/951,378

(22) Filed: Nov. 18, 2020

(65) Prior Publication Data

US 2021/0148045 A1  May 20, 2021

Related U.S. Application Data

(60) Provisional application No. 62/937,403, filed on Nov. 19, 2019.

(51) Int. Cl.
| | | |
|---|---|---|
| *D06P 5/00* | (2006.01) | |
| *D06Q 1/14* | (2006.01) | |
| *B32B 7/09* | (2019.01) | |
| *D06P 5/20* | (2006.01) | |
| *D06P 5/28* | (2006.01) | |

(52) U.S. Cl.
CPC ............... *D06Q 1/14* (2013.01); *B32B 7/09* (2019.01); *D06P 5/004* (2013.01); *D06P 5/2077* (2013.01); *B32B 2451/00* (2013.01)

(58) Field of Classification Search
CPC ........ D06Q 1/14; B32B 7/09; B32B 2451/00; B32B 2307/4026; B32B 2437/00; B32B 5/022; B32B 5/26; B32B 2250/20; B32B 2255/02; B32B 5/06; B32B 2262/0276; D06P 5/004; D06P 5/2077
USPC .............................................. 8/471, 473, 474
See application file for complete search history.

(56) References Cited

U.S. PATENT DOCUMENTS

| | | | | |
|---|---|---|---|---|
| 8,343,574 B2 * | 1/2013 | Downs | .................... | D06P 5/004 |
| | | | | 427/148 |
| 2005/0227038 A1* | 10/2005 | Zafiroglu | ............. | D04B 21/165 |
| | | | | 428/85 |
| 2009/0075075 A1* | 3/2009 | Abrams | .................... | D06Q 1/00 |
| | | | | 428/354 |
| 2012/0015156 A1* | 1/2012 | Abrams | .................. | B32B 5/026 |
| | | | | 156/322 |
| 2016/0263925 A1* | 9/2016 | Tanrikulu | ................ | D06P 5/004 |
| 2017/0326857 A1* | 11/2017 | Weedlun | .................. | B32B 7/12 |

(Continued)

FOREIGN PATENT DOCUMENTS

| | | | | | |
|---|---|---|---|---|---|
| CN | 103252971 A | * | 8/2013 | ............. | B32B 5/024 |
| EP | 2239139 A2 | * | 10/2010 | ............... | B41N 1/24 |
| JP | 2018510791 | * | 4/2018 | ............. | B32B 27/00 |

OTHER PUBLICATIONS

International Search Report and Written Opinion in corresponding/related International Application No. PCT/US20/61001 dated Feb. 9, 2021.

*Primary Examiner* — Eisa B Elhilo  
(74) *Attorney, Agent, or Firm* — Patent Portfolio Builders PLLC

(57) ABSTRACT

A textile composite contains a sublayer coated with unactivated solid sublimation dyes and incorporated with the layers of the textile composite or placed between a fabric layer and a backing layer. The sublimation dyes are activated with heat and pressure, and dying or coloring the inner strata of the textile composite.

33 Claims, 4 Drawing Sheets

(56) References Cited

U.S. PATENT DOCUMENTS

2018/0327967 A1* 11/2018 Rees ................. D06B 5/00
2018/0345707 A1* 12/2018 LaBonte ............ D06Q 1/00

* cited by examiner

DEEP SUBLIMATION DYEING OF FIBROUS COMPOSITES

CROSS-REFERENCE TO RELATED APPLICATIONS

The present invention claims priority to U.S. Provisional Patent Application No. 62/937,403 filed Nov. 19, 2019. The entire contents of which are incorporated herein by reference.

TECHNICAL FIELD

Embodiments of the subject matter disclosed herein relate to fabrics and fibrous-faced composites printed using printing dyes activated by sublimation.

BACKGROUND

Sublimation printing or dye sublimation printing transfers images, designs or colors onto a desired surface or material by converting a solid dye directly to a gaseous state. Therefore, sublimation printing does not involve a liquid step but transfers directly from solid to gas through a chemical process. Sublimation printing, however, tends to penetrate only a short distance into the surface or material, which limits the application of sublimation printing. For example, sublimation printing is used where the surface to be printed is relatively flat. Sublimation printing is also used on textured surfaces in applications where depth of color penetration into the textured surface is less important.

In applications such as fibrous floorcoverings and other high wear applications where the surface is more open and susceptible to deformation during use, the depth of dye penetration is important. Greater dye penetration helps maintain surface appearance. In deep three-dimensional structures, penetration of the sublimation dyes is limited, even when those dyes are directly printed onto the surface of the fabric rather than being printed onto a traditional transfer paper to be later transferred to the fabric. When the printed surface is embossed with three-dimensional patterns, the face structure tends to open up and expose the lower strata of the fabric, which increases the severity of the problem caused by shallow penetration of sublimation printing.

Pre-colored backings and substrates have been used in processes such as tufting or stitch-bonding. Yarn tufts or yarn overlaps and underlaps are inserted through the colored backings to reduce the contrast between the elevated yarn surfaces and the face of the backing exposed when the face yarns part with use or when the fabric is embossed. Unless the surface of the backing and the looped tips of the stitched or tufted yarns are uniformly and identically colored, the used of pre-colored backings and substrates is only partially effective. The effectiveness of pre-colored backings and substrates is further decreased when coloring of the projecting tufted or stitched yarn loops is performed by sublimation from a prepared sheet, because the lower portions or "roots" of the yarns entering the backing or substrate are not covered with dye. These roots lacking dye become visible when the inserted loops bend during use or over time due to accumulating wear.

A similar problem occurs in a needle-punched fabric. Surface fibers are inserted into a fibrous or non-fibrous sublayer, and the composite is printed with sublimated dyes from a carrier paper. The depth of dye penetration into the composite is limited, and occasional undyed spots become visible with or without disturbing the surface even when the sublayer is pre-dyed or preprinted with the same color.

Therefore, sublimation-printing of three-dimensional and relatively open fibrous surfaces with a dye depth that is not susceptible to loss of definition or color with wear or embossing is desired.

SUMMARY

Exemplary embodiments are directed to fibrous composites containing a polymeric sublayer pre-printed with sublimation inks. The polymeric sublayer is preferably a co-polyester fabric or film. Alternatively, the polymeric sublayer is a film or fabric extrusion-coated or powder-coated with a co-polyester. The sublayer can be a yarn-structure such as a woven or knit structure or a nonwoven staple or filament structure such as a spun-bonded, spun-laced, carded and bonded fabric, a fibrous felt, a scrim, or a solid or perforated film. This sublayer is tufted or stitch-bonded with yarns, covered with a nonwoven layer by needle-punching, or laminated or pattern-bonded to a bulky fabric to create a three-dimensional fabric. Upon the application of heat or preferably heat and pressure, the sublimation dyes are propelled towards the top surface. The sublimation dyes start at the roots of the fibers or yarns adjacent to the sublayer, which are not normally colored to a sufficient depth by sublimation dyes applied from the top surface.

In one embodiment, the top surface is simultaneously dyed with the same color or a companion color. A dye carrier sheet, for example, a paper sheet containing the sublimation dye is placed against the top surface, and heat or heat and pressure are applied from above toward the top surface. In one embodiment, the tufted, stich-bonded, needle-punched, or pattern-bonded sublayer is shrinkable with heat, and the sublimation dyes are propelled towards the top surface as the fibrous composite is shrunk and bulked. In one embodiment, the original top surface is blank or pre-dyed with transfer dyes. In one embodiment, the fibers or yarns along the top surface are originally "solution dyed" in molten form before the fibers or yarns are formed.

Exemplary embodiments generate a composite fabric or fibrous composite having substantially improved depth of color. In one embodiment, the composite fabric is embossed during the dye sublimation process using a heated embossing tool or roll containing a three-dimensional pattern, conforming the composite fabric to the three-directional pattern with sublimated dyeing. In one embodiment, the composite is bulked, shrunk or bulked and shrunk either before or after the application of heat and pressure to activate the sublimation dyes.

Exemplary embodiments are directed to a method for dyeing a textile composite. At least a portion of a first surface of a sublayer is coated with a solid sublimation dye. In one embodiment, the first surface is completely coated with the solid sublimation dye. In one embodiment, at least the portion of the first surface is coated with two or more solid sublimation dyes. In one embodiment, at least the portion of the first surface is coated with the solid sublimation dye arranged in a pre-determined pattern.

The sublayer containing the solid sublimation dye is incorporated into the textile composite. The textile composite includes at least a first layer adjacent the first surface of the sublayer. The first layer includes yarns, fibers, tufted yarn loops, tufted yarn back-laps, underlap yarn loops, overlap yarn loops or a textile layer containing oriented fibers. Suitable methods for incorporating the sublayer into the textile composite include, but are not limited to, tufting, stitch-bonding, needle-punching, laminating, and pattern-bonding.

The solid sublimation dye is activated and converted to a gas sublimation dye that permeates the first layer from the first surface of the sublayer and solidifies within the first layer. In one embodiment, the solid sublimation dye is activated by heating the textile composite or heating and applying pressure to the textile composite. In one embodiment, activating the solid sublimation dye includes heating the textile composite to at least 250° F. In one embodiment, activating the solid sublimation dye includes heating the textile composite to 400° F.

In one embodiment, the area of the textile composite is shrunk by at least 5% to bulk the textile composite and to increase a density of the solid sublimation dye per unit area of the textile composite. In one embodiment, the area of the textile composite is shrunk by at least 25% to bulk the textile composite and to increase a density of the solid sublimation dye per unit area of the textile composite.

In one embodiment, a separate carrier sheet containing at least one additional solid sublimation dye is placed against the first layer opposite the first surface of the sublayer, and the additional solid sublimation dye is activated to an additional gas sublimation dye simultaneously with the activation of solid sublimation dyes on the first surface.

In one embodiment, the textile composite includes a second layer adjacent a second surface of the sublayer opposite the first surface, and at least a portion of the second surface of the sublayer is coated with at least one additional solid sublimation dye. The additional solid sublimation dye on the second surface is activated to an additional gas sublimation dye simultaneously with the activation of solid sublimation dye on the first surface.

In one embodiment, the sublayer is a primary backing, and the sublayer is incorporated by tufting yarn through the sublayer to form tufted yarn loops adjacent the first surface and tufted yarn back-laps adjacent a second surface of the sublayer opposite the first surface. The tufted yarn loops are the first layer of the textile composite, and the tufted yarn back-laps are a second layer of the textile composite. In one embodiment, the sublayer is a substrate, and the sublayer is incorporated by stitch-bonding yarn through the sublayer to form underlap yarn loops adjacent the first surface of the sublayer and overlap yarn loops adjacent a second surface of the sublayer opposite the first surface. The underlap yarn loops are the first layer of the textile composite, and the overlap yarn loops are a second layer of the textile composite. In one embodiment, the overlaps are the first layer of the textile composite, and the overlaps are the second layer of the textile composite.

In one embodiment, incorporating the sublayer into the textile composite includes placing a plurality of fibers adjacent the first surface of the sublayer to form the first layer, and needle-punching fibers from the plurality of fibers through the first surface of the sublayer to form a needle-punched textile composite. In one embodiment, to incorporate the sublayer into the textile composite, the first layer is laminated to the first surface of the sublayer with the solid sublimation dye disposed between the first layer and the face layer. In one embodiment, the first layer is laminated to the first surface while simultaneously activating the solid sublimation dye. In one embodiment, laminating the first layer to the first surface includes pattern bonding the first layer to the first surface to create depressed surface areas and elevated surface areas in the laminate such that solid sublimation dye activated during lamination proceeds into the elevated surface areas. In one embodiment, laminating the first layer to the first surface includes area bonding the first layer to the first surface such that solid sublimation dyes disposed in bonding areas of the sublayer release from the first surface before the first layer and the first surface are joined by area bonding.

Exemplary embodiments are also directed to a method for forming a textile composite where at least a portion of a first surface of a sublayer is coated with a first solid sublimation dye, and at least a portion of a second surface of the sublayer is coated with a second solid sublimation dye. The second surface is opposite the first surface. In one embodiment, the first surface is coated with a first plurality of solid sublimation dyes arranged in a first pattern, and the second surface is coated with a second plurality of solid sublimation dyes arranged in a second pattern. In one embodiment, the first pattern is different than the second pattern.

A first layer is laminated to the first surface, and a second layer is laminated to the second surface. In one embodiment, laminating includes stitching-bonding the first layer and the second layer to the sublayer. In one embodiment, laminating includes needle-punching the first layer and the second layer to the sublayer. In one embodiment, the sublayer is a low melt layer, and laminating the first layer and the second layer to the sublayer includes applying heat and pressure sufficient to melt the sublayer and to activate the first sublimation dye and the second sublimation dye.

The first solid sublimation dye is activated to a first gas sublimation dye that permeates the first layer from the first surface of the sublayer and solidifies within the first layer, and the second solid sublimation dye is activated to a second gas sublimation dye that permeates the second layer from the second surface of the sublayer and solidifies within the second layer.

In one embodiment, a first separate carrier sheet containing at least one first additional solid sublimation dye is placed against the first layer opposite the first surface, and a second separate carrier sheet containing at least one second additional solid sublimation dye is placed against the second layer opposite the second surface. Activating the solid sublimation dye to the gas sublimation dye further includes activating each first additional solid sublimation dye to a first additional gas sublimation dye and each second additional solid sublimation dye to a second additional gas sublimation dye simultaneously with the activation of first and second solid sublimation dyes.

In one embodiment, the textile composite is embossed with a three-dimensional pattern. In one embodiment, embossing the textile composite occurs simultaneously with activating the first and second solid sublimation dyes. In one embodiment, activating the first solid sublimation dye and the second solid sublimation due includes heating the textile composite or heating and applying pressure to the textile composite.

BRIEF DESCRIPTION OF THE DRAWINGS

The accompanying drawings, which are incorporated in and constitute a part of the specification, illustrate a number of embodiments and, together with the following descriptions, explain these embodiments.

DETAILED DESCRIPTION

The following description of the embodiments refers to the accompanying figures. The same reference numbers in different figures identify the same or similar elements. Reference throughout the whole specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, particular features, structures or characteristics may be combined in any suitable manner in one or more embodiments.

Exemplary embodiments are directed to composite fabrics containing a fibrous or non-fibrous sublayer enclosed within the composite fabric. In one embodiment, the fibrous or non-fibrous sublayer is contained within a multilayer composite fabric. In one embodiment, the fibrous or non-fibrous sublayer is attached onto the back of the composite fabric. The sublayer is pre-coated with one or more inactivated, solid sublimation dyes. Suitable sublimation dyes are known and available in the art. In addition, any suitable method known and available in the art for coating a surface with solid sublimation dyes can be used. In one embodiment, the solid sublimation dyes are printed onto the sublayer. The composite fabric is then heated, causing the dyes present on the surface of the sublayer to sublimate and proceed towards the outer surface. The dyes are propelled towards the outer surface. Migration of the dye colors portions of the fibers immediately over or adjacent the sublayer. In one embodiment, the composite fabric is heated by setting or placing the composite fabric against a heated surface. The degree or extent of penetration of the dyes towards the outer surface depends on temperature, e.g., temperature of the heated surface, depth and mass of fibers present over the sublayer, amount of dyes pre-applied to the sublayer, and amount or level of pressure applied to the surface. In one embodiment, a sheet precoated with sublimation dyes is placed against the outer surface of the composite fabric simultaneously with the application of heat.

Figure 1:
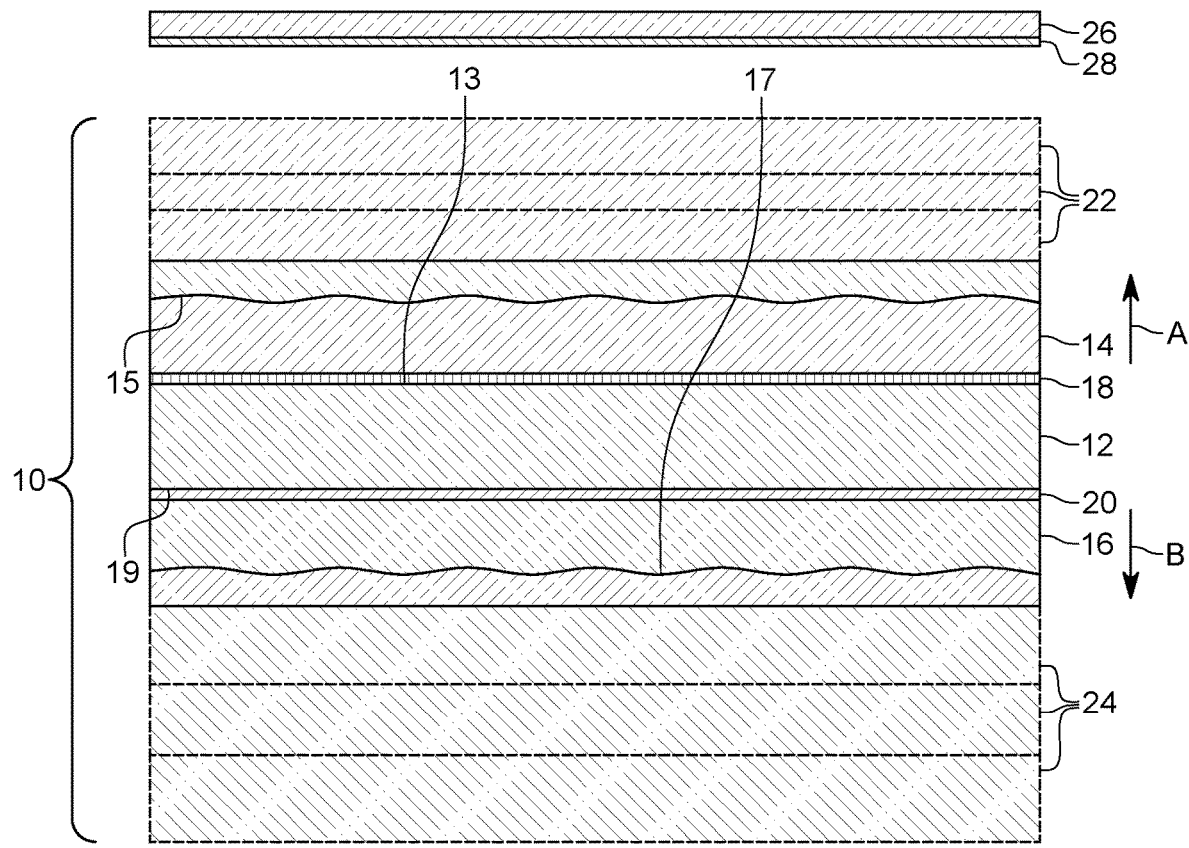
FIG. 1 is a schematic representation of an embodiment of a textile composite containing a sublayer and sublimation dyes.

Exemplary embodiments are directed to methods for dyeing, coloring or printing a textile composite and to the textile composited dyed in accordance with these methods. Referring initially to FIG. 1, a sublayer 12 for the textile composite 10 is selected, and at least a portion of a first surface 13 of the sublayer is covered with a solid sublimation dye 18. In one embodiment, the sublayer is a lightly bonded nonwoven layer containing polyester or a polyester blend. Any suitable sublimation dye known and available in the art can be used including low energy dyes, medium energy dyes, and high energy dyes. Preferably, high energy sublimation dyes are used, i.e., sublimation dyes that are used at higher temperatures. Suitable methods for coating the sublayer with solid sublimation dyes include, but are not limited to, depositing solid sublimation dyes, i.e., dyes that go from solid to vapor, in a solution or suspension and using digital printing to pre-coat the sublayer or any other desired surface. The sublimation dyes can be applied as overlapping layers of sublimation dyes or as a single pre-determined pattern of separate or overlapping sublimation dyes.

In one embodiment, a single solid sublimation dye is used to coat the entire first surface of the sublayer completely. Alternatively, two, three or more solid sublimation dyes are used to coat the entire first surface of the sublayer. In one embodiment, a single solid sublimation dye is used to cover one, two, three or more separate sections or areas of the first surface. Alternatively, two, three or more solid sublimation dyes are used to cover the separate sections or areas of the first surface. In one embodiment, the two, three or more solid sublimation dyes can overlap, at least partially. In one embodiment, the solid sublimation dye is placed on the first surface in accordance with a pre-determined pattern. Alternatively, two, three or more solid sublimation dyes are placed on the first surface in accordance with the pre-determined pattern. Multiple solid sublimation dyes are sublimation dyes that vary in at least one of color, tone, hue, and tint.

Figure 2:
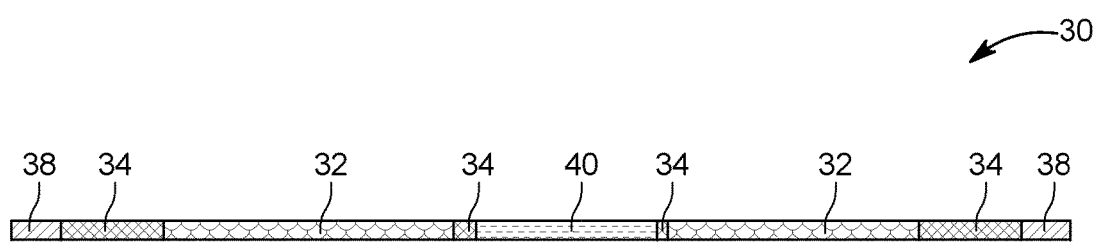
FIG. 2 is an illustration of a cross-section of an embodiment of solid sublimation dyes.
Figure 3:
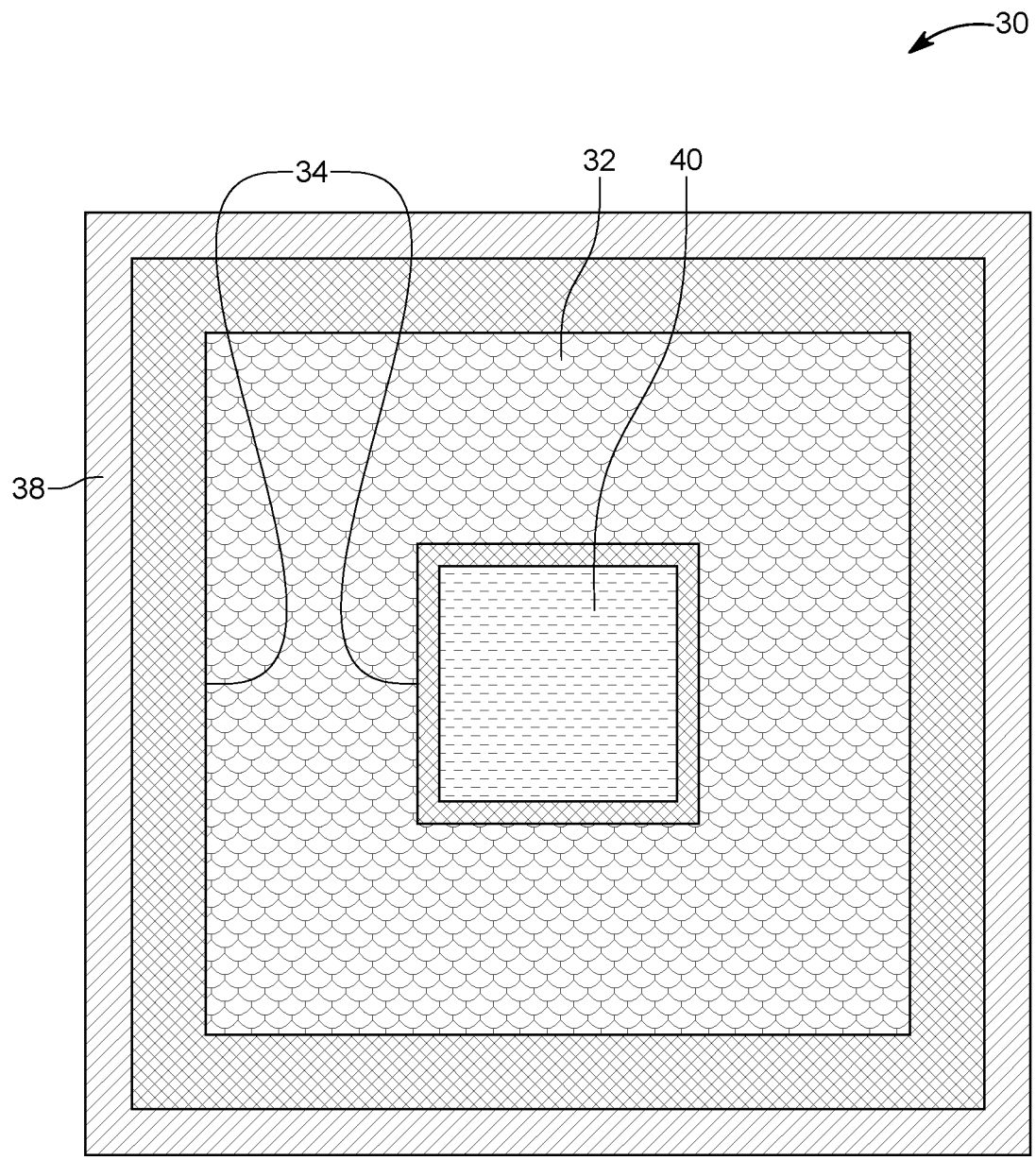
FIG. 3 is an illustration of a plan view of the embodiment of solid sublimation dyes.

Referring now to FIGS. 2 and 3, an exemplary embodiment of an arrangement of solid sublimation dyes 30 used to cover the first surface is illustrated. As illustrated, the solid sublimation dyes are arranged in a common layer, with each solid sublimation dye occupying a separate and distinct area of the first surface and portion of the pattern. Alternatively, the solid sublimation dyes can be arranged or applied in two layers, three layers, or more layers. The pattern includes a first solid sublimation dye 32 in contact with the first layer and covering a desired area of the first surface of the sublayer with a single solid sublimation dye. A second solid sublimation dye 34 is positioned on the first layer and covers two separate portions of the first layer. The second solid sublimation dye covers two separate rectangular areas of the first layer. A third solid sublimation dye 38 is placed on the first surface and covers or forms a border or frame around the first surface. A fourth solid sublimation dye 40 is a rectangular section centered on the first surface and covers a portion of the central portion of the first surface. Other types of patterns of solid sublimation dyes can be used, e.g., cross-hatching, lines, and plaids. In addition, the areas covered by each solid sublimation dye can have shapes other than rectangular and square, e.g., circular, oblong, and triangular. In one embodiment, the solid sublimation dyes are in a common layer or laid down on one sheet that is attached to or imbedded into the first surface such that the common layer does not have overlapping colors. In one embodiment, the solid sublimation dyes are printed onto the first surface or sheet such that there is only one layer of blended color to form the desired pattern. While the pattern is illustrated with solid sublimation dyes in a single layer and occupying separate portions of the first surface, the solid sublimation dyes can at least partially overlapping in the pattern or can completely overlap.

Returning to FIG. 1, in one embodiment, at least a portion of the second surface 19 of the sublayer 12 is coated with at least one additional solid sublimation dye 20. The second surface of the sublayer is opposite the first surface. Suitable methods for coating the second surface with a solid sublimation dye and suitable arrangements of solid sublimation dyes are the same as for the solid sublimation dyes coated on the first surface. In one embodiment, the solid sublimation dyes coated on the second surface are identical to the solid sublimation dyes coated on the first surface. Alternatively, the solid sublimation dyes coated on the second surface differ from the solid sublimation dyes coated on the first surface.

The sublayer 12 containing the solid sublimation dye or dyes on the first surface, the second surface or both the first surface and the second surface is incorporated into the textile composite 10. Suitable methods for incorporating the sublayer into the textile composite include, but are not limited to, tufting, stitch-bonding, needle-punching, laminating, and pattern-bonding. Suitable textile composites include tufted fabrics, stitch-bonded fabrics, needle-punched fabrics, laminated composites, floorings tiles and wall tiles.

The textile composite can include two, three or more layers including the sublayer. In one embodiment, the textile composite includes at least a first layer 14 adjacent the first surface 13 of the sublayer. The solid sublimation dyes are disposed between the first layer and the first surface. In one embodiment, the textile composite includes a second layer 16 adjacent the second surface 19 of the sublayer opposite the first surface. The solid sublimation dyes are disposed between the second layer and the second surface. Suitable first layers and second layers include yarns, fibers, tufted yarn loops, tufted yarn back-laps, underlap yarn loops, overlap yarn loops and a textile layer comprising oriented fibers. The textile composite can include one or more additional layers 22 over the first layer and one or more additional layers 24 over the second layer.

The solid sublimation dye or dyes disposed between the first layer and the first surface are activated to a gas sublimation dye 15 that permeates the first layer in the direction of arrow A from the first surface of the sublayer. The gas sublimation dye solidifies within the first layer, printing, coloring or dying the first layer from the first surface. In one embodiment, gas sublimation dyes pass completely through the first layer. In one embodiment, the gas sublimation dyes pass at least partially through any additional layers placed over the first layer. When the textile composited includes solid sublimation dyes between the second surface and the second layer, the solid sublimation dye or dyes disposed between the second layer and the second surface are activated to a gas sublimation dye 17 that permeates the second layer in the direction of arrow B from the second surface of the sublayer. The gas sublimation dye solidifies within the second layer, printing, coloring or dying the second layer from the second surface. In one embodiment, gas sublimation dyes pass completely through the second layer. In one embodiment, the gas sublimation dyes pass at least partially through any additional layers placed over the second layer. In embodiment, activation of the solid sublimation dye on the second surface to an additional gas sublimation dye is performed simultaneously with the activation of solid sublimation dye on the first surface.

Suitable methods for activating the solid sublimation dyes include heating the textile composite and heating and applying pressure to the textile composite. Suitable methods for heating the textile composite include radiant heating, conductive heating and convective heating. In one embodiment, the textile composite is heated to at least 250° F. In one embodiment, the textile composite is heated to 400° F. Sublimation dyes most commonly sublime at around 250° F., with full sublimation occurring upon exposure at 400° F. for 30 sec. In one embodiment, pressure is applied across the entire area of the textile composite. Alternatively, pressure is applied selectively to certain locations or areas within the textile composite. In one embodiment, heat and pressure sufficient to activate the solid sublimation dyes are applied simultaneously with laminating layers of the textile composite together or with embossing a pattern in the textile composite.

In one embodiment, a separate carrier sheet 26 containing at least one additional solid sublimation dye 28 is placed against the first layer opposite the first surface of the sublayer. In one embodiment, a separate carrier sheet is placed against the second layer opposite the second surface of the sublayer. Suitable carrier sheets include, but are not limited to, standard sublimation paper of 30 to 90 gsm. Suitable arrangements of these additional solid sublimation dyes are the same as for the solid sublimation dyes coated on the first surface. In one embodiment, the additional solid sublimation dyes on the carrier sheet are identical to the solid sublimation dyes coated on the first surface. Alternatively, the additional solid sublimation dyes on the carrier sheet differ from or are complimentary to the solid sublimation dyes coated on the first surface. The additional solid sublimation dye or dyes are activated to an additional gas sublimation dye simultaneously with the activation of solid sublimation dyes on the first surface. The additional gas sublimation dye propagates into the textile composite toward the first surface.

Figure 4:
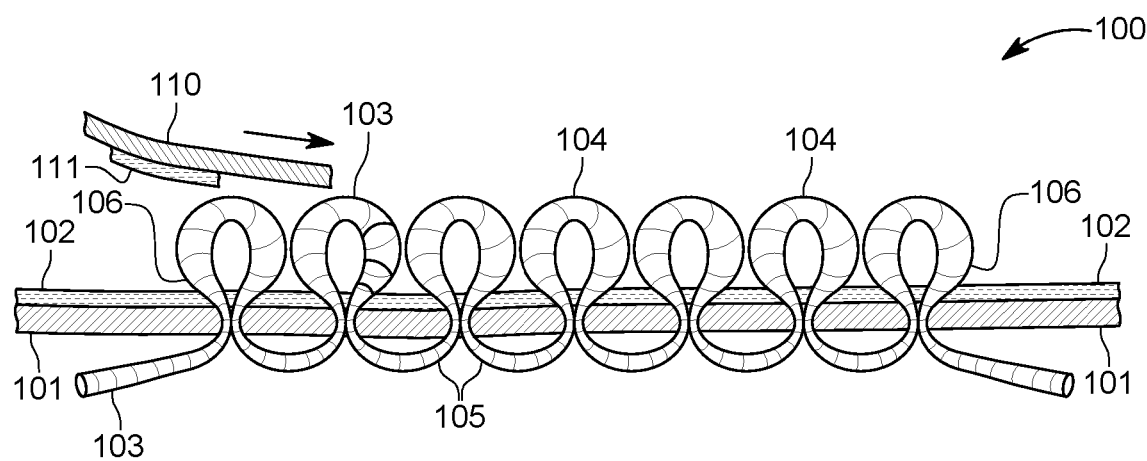
FIG. 4 is a schematic representation of an embodiment of a composite tufted fabric with the primary backing coated with solid sublimation dyes.

Referring now to FIG. 4, in one embodiment, the textile composite is a composite tufted fabric 100. The sublayer is a primary backing 101 precoated on at least a portion of the first surface with one or more inactivated solid sublimation dyes 102. The sublayer is incorporated into the composite tufted fabric by tufting yarn 103 through the sublayer to form tufted yarn loops 104 adjacent the first surface and tufted yarn back-laps 105 adjacent the second surface of the sublayer opposite the first surface. The tufted yarn loops are the first layer of the textile composite, and the tufted yarn back-laps are the second layer of the textile composite. In one embodiment, the tops of the tufted loops 104 opposite the primary backing are also dyed with sublimation dyes. In one embodiment, the tops of the tufted loops are dyed simultaneously with the activation of the solid sublimation dyes on the sublayer. Alternatively, the tops of the tufted loops are dyed separate from activation of the solid sublimation dyes on the sublayer. In one embodiment, solid sublimation dyes are placed in contact with the tops of the tufted loops. In one embodiment, these solid sublimation dyes are the same color or same pattern as the solid sublimation dyes on the sublayer. Alternatively, the solid sublimation dyes on the tops of the tufted loops are a different color, a companion color, or a different color pattern from the solid sublimation dyes on the first surface of the sublayer.

In one embodiment, the additional sublimation dyes 111 to be applied to the tops of the tufted loops are positioned on a carrier 110 that is used to apply the sublimation dyes to the top of the tufted loops. In one embodiment, heat or heat and pressure is applied to the composite tufted fabric from above, i.e., toward the tufted loops. The sublimation dyes 102 on the first surface of the sublayer, and any additional sublimation dyes 111 on the top of the tufted loops are activated, causing the coloration of the base or roots 106 of the tufted loops. Coloration of the roots of the tufted loops prevents exposure of undyed yarn segments at the roots as the tufted loops 104 bend during or after use of the composite tufted fabric, for example, as a floor covering.

Figure 5:
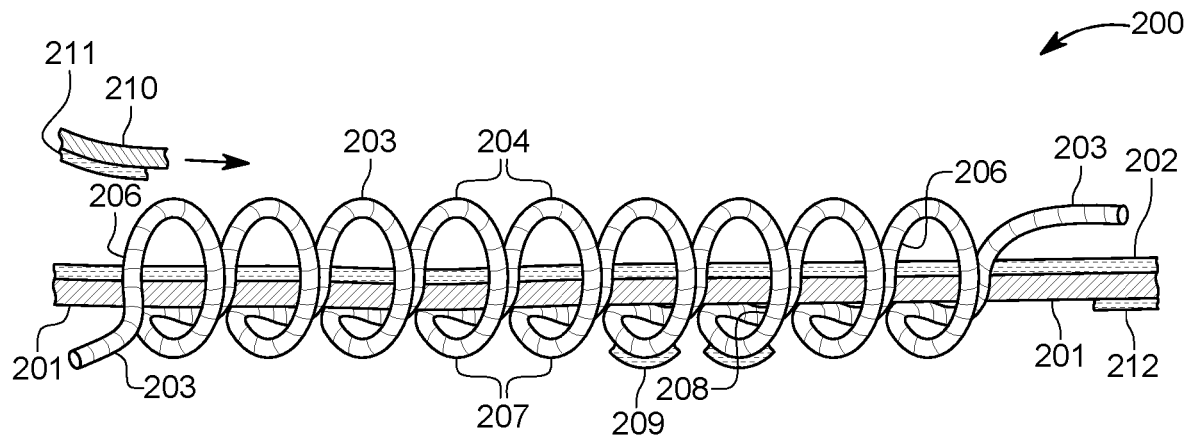
FIG. 5 is a schematic representation of an embodiment of a composite stitch-bonded fabric with the substrate coated on the technical back side with solid sublimation dyes.

Referring now to FIG. 5, in one embodiment, the textile composite is a composite stitch-bonded fabric 200. The sublayer is a substrate 201, and the first surface of the substrate is coated with one or more solid sublimation dyes 202. The substrate is incorporated into the sublayer by stitch-bonding yarn 203 through the sublayer to form underlap yarn loops 204 adjacent the first surface of the sublayer and overlap yarn loops 207 adjacent a second surface of the sublayer opposite the first surface. The underlap yarn loops are the first layer of the textile composite, and the overlap yarn loops are a second layer of the textile composite. In one embodiment, the solid sublimation dyes are located on the same side of the substrate as the underlap loops 204 as shown in FIG. 5. Alternatively, the overlaps form the first layer of the composite, and the solid sublimation dyes are placed on the second surface of the substrate under the overlaps. The sublimation dyes can be applied as overlapping layers of sublimation dyes or as a pre-determined pattern of sublimation dyes.

In one embodiment, wherein the sublimation dyes are placed on the underlap side, the top of the underlap loops 204 opposite the first surface of the sublayer are dyed or colored using sublimation dyes. In one embodiment, the tops of the underlap loops are dyed simultaneously with the activation of the solid sublimation dyes on the sublayer. Alternatively, the tops of the underlap loops are dyed separate from activation of the solid sublimation dyes on the sublayer. In one embodiment, additional solid sublimation dyes are placed in contact with the top of the underlap loops. In one embodiment, these additional solid sublimation dyes are the same color, the same pattern or the same color and the same pattern as the solid sublimation dyes on the sublayer. Alternatively, the solid sublimation dyes on the top of the underlap loops are a different companion color, a different color pattern or a different companion color and a different color pattern from the solid sublimation dyes on the substrate. In one embodiment, the additional sublimation dyes 211 to be applied to the top of the underlap loops are positioned on a carrier or carrier sheet 210 that is used to apply the sublimation dyes to the top of the underlap loops. In one embodiment, heat or heat and pressure is applied from the underlap loop side of the composite stitch-bonded fabric to activate or sublimate the dyes and to color the roots 206 of the underlap loops in addition to coloring the tips or tops of the underlap loops 204.

In one embodiment, additional solid sublimation dyes 209 are coated on the overlaps 207 opposite the second surface of the sublayer. Suitable arrangements and methods for coating the solid sublimation dyes on the overlaps are the same as for the underlap loops. In embodiment, additional sublimation dyes 212 are coated on the second surface of the sublayer such that the additional sublimation dyes are located between the substrate and the overlap loops. Suitable additional solid sublimation dyes, arrangements of additional solid sublimation dyes and methods of coating or applying additional sublimation dyes are the same as the other solid sublimation dyes in the composite stitch-bonded fabric. These additional sublimation dyes on the opposite side 212 of the sublayer 201 and the tops of the overlaps cause the coloring of roots 208 of the overlaps in addition to the coloring of the tips or tops 207 of the overlaps.

Figure 6:
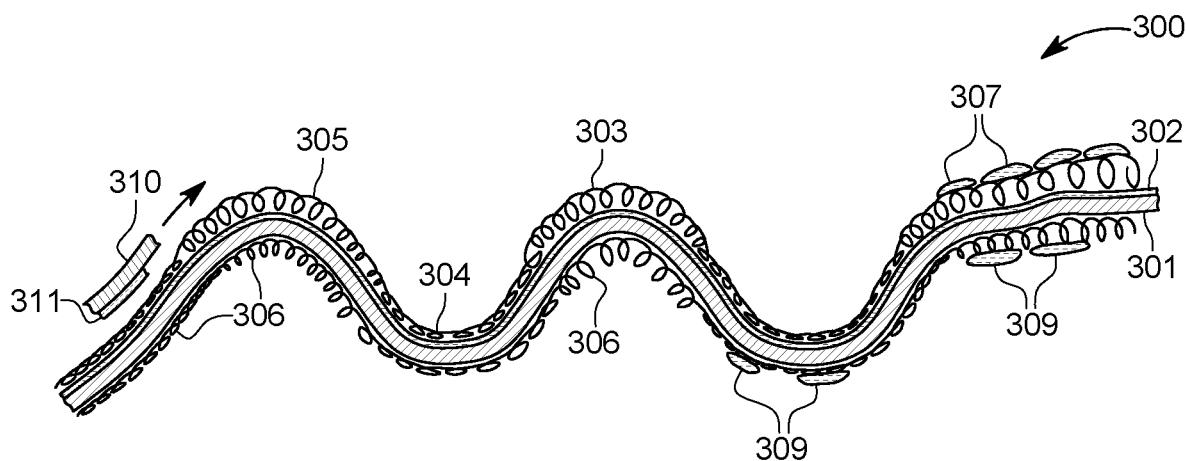
FIG. 6 is a schematic representation of an embodiment of a textile composite embossed with a three-dimensional pattern.

Referring now to FIG. 6, in one embodiment a highly textured textile composite 300 is formed containing yarns that form loops as the yarns enter and exit the sublayer 301. These yarn loops can be formed by processes, including, but not limited to, tufting and stitch-bonding. In one embodiment, the first layer or overlayer 305 is pre-dyed on the surface with dyes 307, and the second layer or underlayer 306 is pre-dyed on the surface with dyes 309. The first side of the sublayer 301 is precoated with one or more solid sublimation dyes 302. The textile composite 300 is embossed with a deep three-dimensional pattern, forming highly compressed and depressed areas 304 and relatively uncompressed elevated areas 303. During the embossing process, the solid sublimation dyes on the first side proceed upward from the precoat 302 in both the elevated areas and the depressed areas of the embossed composite fabric. Propagation of the sublimation dyes colors the yarn sections under the top surface across the entire three-dimensional contour of the embossed composite fabric.

In one embodiment, an additional solid sublimation dye layer 311 is attached to a carrier sheet 310 and is transferred to the top of the textile composite. In one embodiment, the additional solid sublimation dye layer contains the same colors, the same pattern or the same colors and the same color pattern as the solid sublimation dyes coated on the sublayer. In one embodiment, the additional solid sublimation dye layer contains different colors, different patterns or different colors and different color patterns as the solid sublimation dyes coated on the sublayer. In one embodiment, the additional sublimation dyes are applied before embossing the composite fabric. Alternatively, the additional sublimation dyes are applied simultaneously with embossing. The additional sublimation dye layer is activated by the pressure and heat applied during embossing, and the dye proceeds into the textile composite towards the sublayer. While illustrated for a composite fabric containing yarns loops, embossing using the deep three-dimensional pattern can be applied to any textile composite discussed herein including textile composites formed with individual staple or filament fibers.

Figure 7:
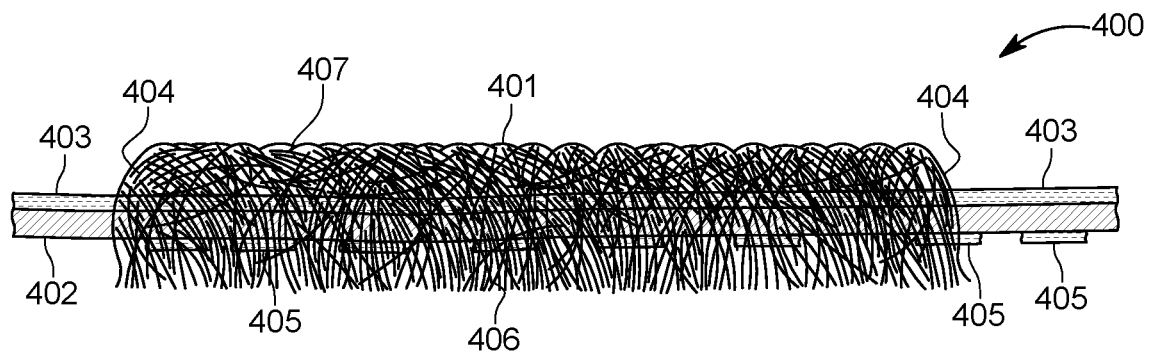
FIG. 7 is a schematic representation of an embodiment of a composite needle-punched fabric with the sublayer coated with solid sublimation dyes.

Referring now to FIG. 7, in one embodiment, the textile composite is a needle-punched textile composite 400. The first surface of the sublayer 402 is coated with a plurality of solid sublimation dyes 403. In one embodiment, the sublimation dyes are applied as overlapping layers of solid sublimation dyes. In one embodiment, the sublimation dyes are applied as a pre-determined pattern of solid sublimation dyes. A plurality of fibers 407 are placed adjacent the first surface of the sublayer to form the first layer. Fibers from the plurality of fibers are needle-punched through the first surface of the sublayer to form a needle-punched textile composite. The solid sublimation dyes 403 are located between the sublayer and the top surface 401 of the composite fabric. Upon the application of heat to the textile composite, e.g., to the top surface of the textile composite, the dyes sublimate and propagate through the plurality of fibers towards the top surface. Propagation of the gas sublimation dyes begin at portions or sections 404 of the fibers adjacent to the sublayer 402.

In one embodiment, the second surface or bottom of sublayer 402 is coated with a plurality of additional solid sublimation dyes 405. Therefore, the additional solid sublimation dyes are disposed between the sublayer and the lower surface 406 of the fibers extending past the second surface. The application of heat propels the activated gas sublimation dyes towards the lower surface 406. Heat is applied from the top surface, from the lower surface or from both the top surface and the lower surface. In one embodiment, the same temperature is applied to the top surface and the lower surface. Alternatively, different temperatures are applied to the top surface and the lower surface.

Figure 8:
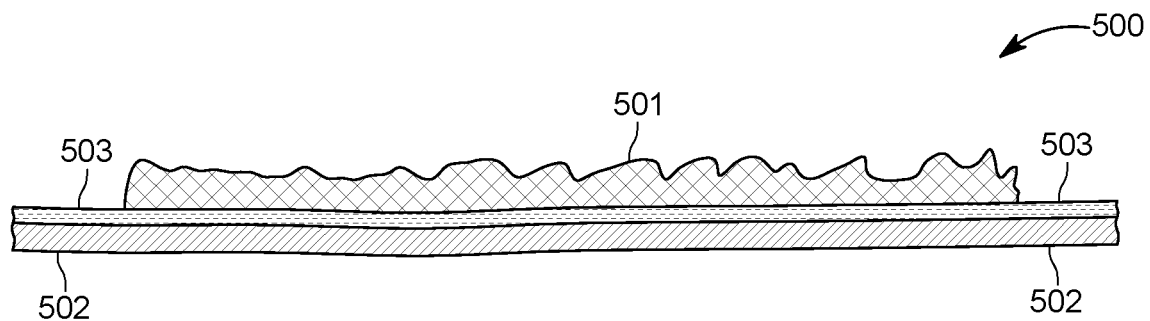
FIG. 8 is a schematic representation of an embodiment of a textile composite containing two fabrics bonded to each other using a low melt adhesive layer coated with solid sublimation dyes.

Referring now to FIG. 8, in one embodiment, the textile composite is a bulky composite fabric 500. The sublayer 502 is coated with a plurality of inactivated, solid sublimation dyes 503. In one embodiment, the sublayer is a fibrous layer. In one embodiment, the sublayer is a non-fibrous layer. The sublayer is incorporated into the textile composite by laminating the first layer 501 to the first surface of the sublayer. The solid sublimation dyes 503 are disposed between the first layer and the first layer. In one embodiment, the first layer is a planar textile layer formed with three-dimensionally oriented fibers. Heat or heat and pressure is applied to the bulky composite fabric, activating the solid sublimation dyes. The resulting gas sublimation dyes propagate from the sublayer through the first layer. In one embodiment, the solid sublimation dyes are activated simultaneously with lamination of the first layer to the sublayer. In one embodiment, the bulky composite fabric 500 is simultaneously laminated and embossed, i.e., with a three-dimensional pattern. Propagation of the gas sublimation dyes colors the inner layers of the first layer adjacent to the sublayer 502.

Figure 9:
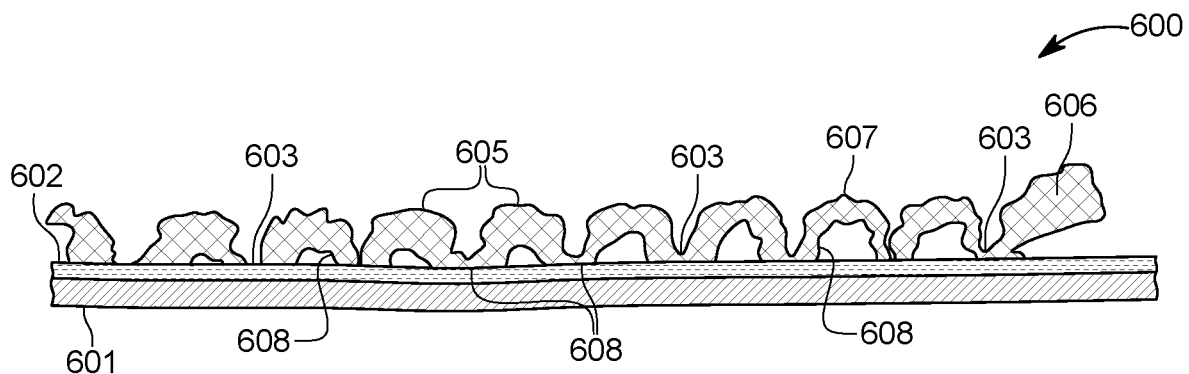
FIG. 9 is a schematic representation of an embodiment of a textile composite with a layer pattern-bonded to a low-melt sublayer coated with solid sublimation dyes.

Referring now to FIG. 9, in one embodiment the textile composite is a bulky composite fabric 600 and the sublayer is a textile substrate 601 coating with a layer of solid sublimation dyes 602. The first layer is a planar textile layer 606, and the sublayer is incorporated into the textile composite by pattern bonding the first layer to the first surface to create a plurality of depressed surface areas 603 and a plurality of elevated surface areas 605 in the resulting laminate. In one embodiment, the sublimation dyes are activated during the bonding process. Alternatively, the sublimation dyes are activated after the bonding process. Solid sublimation dyes activated during lamination proceed into the elevated surface areas and up to the tips or tops 607 of the elevated surface areas. The activated dyes also cover lower portions 608 of the overlaid textile layer. In one embodiment, area bonding is used to laminate the first layer to the first surface. Solid sublimation dyes disposed in bonding areas of the sublayer release from the first surface before the first layer and the first surface are joined by area bonding.

Figure 10:
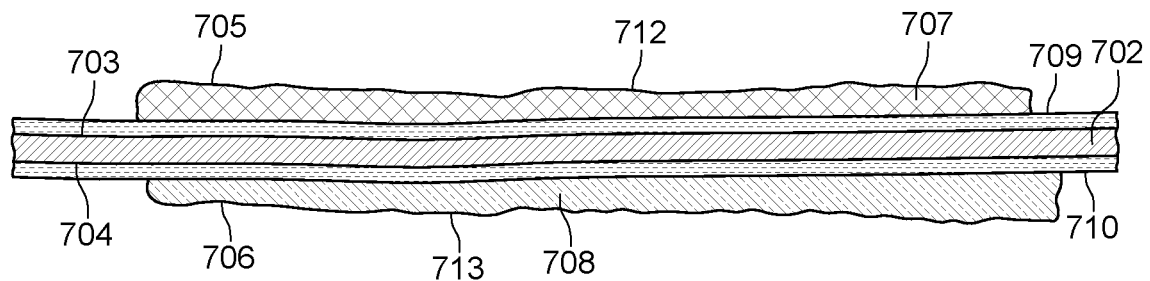
FIG. 10 is a schematic representation of an embodiment of a textile composite containing two fabrics and a central low-melt sublayer coated with solid sublimation dyes on both sides.

Referring to FIG. 10, in one embodiment for forming a textile composite, at least a portion of the first surface 703 of the sublayer 702 is coated with a first solid sublimation dye 709, and at least a portion of a second surface 704 of the sublayer with a second solid sublimation dye 710. In one embodiment, both the first surface and the second surface are each coated with a plurality of inactivated, solid sublimation dyes. In one embodiment, the sublayer is a polymeric low melting sublayer. In one embodiment, the first surface is coated with a first plurality of solid sublimation dyes arranged in a first pattern, and the second surface is coated with a second plurality of solid sublimation dyes arranged in a second pattern. In one embodiment, the first pattern different than the second pattern.

A first layer 705 is placed on the first surface, and a second layer 706 is placed on the second surface. In one embodiment, the first and second layers are textile layers. In one embodiment, the first layer 705 is laminated to the first surface, and the second layer 706 is laminated to the second surface. In one embodiment, laminating includes stitching-bonding the first layer and the second layer to the sublayer. In one embodiment, laminating includes needle-punching the first layer and the second layer to the sublayer.

The first solid sublimation dye is activated to a first gas sublimation dye that permeates the first layer from the first surface of the sublayer and solidifies within the first layer, and the second solid sublimation dye is activated to a second gas sublimation dye that permeates the second layer from the second surface of the sublayer and solidifies within the second layer. Activating the first solid sublimation dye and the second solid sublimation dye involves heating the textile composite or heating and applying pressure to the textile composite. In one embodiment, heat and pressure sufficient to melt the sublayer, which is a polymeric low melting layer, and to activate the first sublimation dye and the second sublimation dye. Upon heating with pressure, the sublayer 702 melts, and the gas sublimation dyes in combination with low-melt polymer propagate toward the corresponding outer surfaces 712 and 713.

In one embodiment, outer surface colors 707 and 708 are present on the outer surfaces 712 and 713 of the first layer and the second layer. In one embodiment, the outer surface colors are added during the lamination process using carrier or release sheets containing solid sublimation dyes. In one embodiment, a first separate carrier sheet containing at least one first additional solid sublimation dye is placed against the first layer opposite the first surface, and a second separate carrier sheet containing at least one second additional solid sublimation dye is placed against the second layer opposite the second surface. Each first additional solid sublimation dye is activated to a first additional gas sublimation dye, and each second additional solid sublimation dye is activated to a second additional gas sublimation dye. Activation occurs simultaneously with the activation of first and second solid sublimation dyes. In one embodiment, the first layer and the second layer contain low melt fibers that are activated during the lamination process. Therefore, the integrity of the central layer is preserved.

In one embodiment, the textile composite is embossed with a three-dimensional pattern. For example, the textile composite is embossed simultaneously with activating the first and second solid sublimation dyes.

Exemplary embodiments adjust one or more fabric finishing processes utilizing heat, exemplified by dyeing, laminating, pattern-bonding, bulking, shrinking and embossing processes to maximize dyeing of the strata, such as fibrous strata, deep within the layers of the textile composite. Suitable adjustments include, but are not limited to, adjusting the location of the solid sublimation dyes, adjusting the type of solid sublimation dyes, adjusting the amount or thickness of each solid sublimation dye, adjusting the sequence of applying heat and pressure to the textile laminate to activate the solid sublimation dyes, adjusting the density of sublimation dyes through bulking and shrinkage of the textile composite, adjusting the location at which heat and pressure are applied and adjusting the amount or level of heat and pressure applied. These adjustments are made in accordance with the dyeing needs of the textile composite, the required plastic flow, and the needs of adhesion and three-dimensional formation.

In one exemplary embodiment, a heated embossing roller having a 3-dimensional pattern is used in a fabric finishing process to affect dying throughout the strata of the textile composite. When applied to the textile composite under pressure, certain areas of the textile composite will experience more pressure and conductive heat, and other areas will experience less pressure and conductive heat based on the shape of the 3-dimensional pattern. These variations in pressure and temperature affect dye sublimation and propagation. Similarly, bulking and shrinking the textile composite is used to increase the concentration of dye within the strata to improve deep dye penetration. For example, bulking the textile composite by 5% up to 25% significantly improves dye penetration among the strata of the textile composite. In one embodiment, the textile composite is shrunk and bulked by heating and shrinking the substrate to cause the outer layers to buckle upwards between attachment points to the substrate. Pressure is reduced, and temperature and exposure time are increased. This preserves the resulting increase in bulk as well as effective dye sublimation.

In one embodiment, the textile composite is bulked after the printed sublayer is incorporated into the textile composite and before the solid sublimation dyes are activated. In one embodiment, the textile composite is bulked simultaneously with activation of the solid sublimation dyes. In one embodiment, bulking of the textile composite is achieved by shrinking an area or surface area of the textile composite, and therefore, the area of the first layer, the second layer and the sublayer. In one embodiment, the area is decreased up to 5%. In one embodiment, the area is decreased up to 25%. As the solid sublimation dyes are printed onto the sublayer, shrinking or decreasing the area of the sublayer increases the density of the solid sublimation dyes per unit area of the sublayer and the textile composite. Therefore, the solid sublimation dyes are placed or printed on the sublayer at a lower initial density, and the desired final density is achieved through bulking. This decreases the amount of solid sublimation dyes used in the textile composite. Alternatively, the solid sublimation dyes are placed or printed on the sublayer at a maximum achievable density, and bulking is used to further increase the density of the solid sublimation dyes. Therefore, a density of solid sublimation dyes in excess of the technical limitations of the printing or placement methods used is achievable. In general, increasing a density of solid sublimation dyes increases an intensity of the colors in the colored, dyed or printed textile composite.

Exemplary embodiments are directed to dyeing, coloring or printing a three-dimensional textile composite or composite fabric using sublimation dyes that color the inner layers of the textile composite that are under the exposed upper surface of the textile composite. The upper face of a sublayer is coated with one or more inactivated, solid sublimation dyes. i.e., sublimation dyes in a solid state. The coated sublayer is incorporated into the textile composite, and heat or heat and pressure is applied. This activates each sublimation dye, i.e., transforms the sublimation dye to a gaseous state. The activated, i.e., gas, sublimation dyes propagate by sublimation toward the exposed upper surface of the textile composite and solidify within the layers of the textile composite. This dyes, colors or prints the entire upper layers of the textile composite including lower portions of the textile composite adjacent to the sublayer under the upper surface. In one embodiment, a separate carrier sheet containing inactivated additional sublimation dyes is placed against the upper surface. The additional sublimation dyes are simultaneously activated with the activation of sublimation dyes on the upper face. Therefore, dye propagates through the upper layers of the textile composite from the sublayer and from the upper surface.

The foregoing written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for dyeing a textile composite, the method comprising:
   coating at least a portion of a first surface of a sublayer with a solid sublimation dye;
   incorporating the sublayer containing the solid sublimation dye into the textile composite, the textile composite comprising at least a first layer adjacent the first surface of the sublayer; and
   activating the solid sublimation dye to a gas sublimation dye that permeates the first layer from the first surface of the sublayer and solidifies within the first layer,
   wherein the sublayer comprises a substrate, and
   wherein incorporating the sublayer comprises stitch-bonding yarn through the sublayer to form underlap yarn loops adjacent the first surface of the sublayer and overlap yarn loops adjacent a second surface of the sublayer opposite the first surface, the underlap yarn loops comprising the first layer of the textile composite and the overlap yarn loops comprising a second layer of the textile composite.

2. The method of claim 1, wherein coating at least the portion of the first surface further comprises completely coating the first surface with the solid sublimation dye.

3. The method of claim 1, wherein coating at least the portion of the first surface further comprises coating at least the portion of the first surface with two or more solid sublimation dyes.

4. The method of claim 1, wherein coating at least the portion of the first surface further comprises coating at least the portion of the first surface with the solid sublimation dye arranged in a pre-determined pattern.

5. The method of claim 1, wherein activating the solid sublimation dye comprises heating the textile composite or heating and applying pressure to the textile composite.

6. The method of claim 1, wherein the method further comprises shrinking an area of the textile composite by at least 5% to bulk the textile composite and to increase a density of the solid sublimation dye per unit area of the textile composite.

7. The method of claim 1, wherein the method further comprises shrinking an area of the textile composite by at least 25% to bulk the textile composite and to increase a density of the solid sublimation dye per unit area of the textile composite.

8. The method of claim 1, wherein activating the solid sublimation dye comprises heating the textile composite to at least 250° F.

9. The method of claim 1, wherein activating the solid sublimation dye comprises heating the textile composite to 400° F.

10. The method of claim 1, wherein:
   the method further comprises placing a separate carrier sheet containing at least one additional solid sublimation dye against the first layer opposite the first surface of the sublayer; and
   activating the solid sublimation dye to the gas sublimation dye further comprises activating the additional solid sublimation dye to an additional gas sublimation dye simultaneously with the activation of solid sublimation dyes on the first surface.

11. The method of claim 1 wherein:
the textile composite comprises a second layer adjacent a second surface of the sublayer opposite the first surface;
the method further comprises coating at least a portion of the second surface of the sublayer with at least one additional solid sublimation dye; and
activating the solid sublimation dye to the gas sublimation dye further comprises activating the additional solid sublimation dye on the second surface to an additional gas sublimation dye simultaneously with the activation of solid sublimation dye on the first surface.

12. A method for dyeing a textile composite, the method comprising:
coating at least a portion of a first surface of a sublayer with a solid sublimation dye;
incorporating the sublayer containing the solid sublimation dye into the textile composite, the textile composite comprising at least a first layer adjacent the first surface of the sublayer; and
activating the solid sublimation dye to a gas sublimation dye that permeates the first layer from the first surface of the sublayer and solidifies within the first layer,
wherein the sublayer comprises a primary backing, and
wherein incorporating the sublayer comprises tufting yarn through the sublayer to form tufted yarn loops adjacent the first surface and tufted yarn back-laps adjacent a second surface of the sublayer opposite the first surface, the tufted yarn loops comprising the first layer of the textile composite and the tufted yarn back-laps comprising a second layer of the textile composite.

13. A method for dyeing a textile composite, the method comprising:
coating at least a portion of a first surface of a sublayer with a solid sublimation dye;
incorporating the sublayer containing the solid sublimation dye into the textile composite, the textile composite comprising at least a first layer adjacent the first surface of the sublayer, wherein incorporating the sublayer into the textile composite comprises
placing a plurality of fibers adjacent the first surface of the sublayer to form the first layer; and
needle-punching fibers from the plurality of fibers through the first surface of the sublayer to form a needle-punched textile composite;
activating the solid sublimation dye to a gas sublimation dye that permeates the first layer from the first surface of the sublayer and solidifies within the first layer.

14. A method for dyeing a textile composite, the method comprising:
coating at least a portion of a first surface of a sublayer with a solid sublimation dye;
incorporating the sublayer containing the solid sublimation dye into the textile composite, the textile composite comprising at least a first layer adjacent the first surface of the sublayer; and
activating the solid sublimation dye to a gas sublimation dye that permeates the first layer from the first surface of the sublayer and solidifies within the first layer,
wherein incorporating the sublayer into the textile composite comprises laminating the first layer to the first surface of the sublayer, the solid sublimation dye disposed between the first layer and the face layer, and
wherein activating the sublimation dye further comprises simultaneously laminating the first layer to the first surface and activating the solid sublimation dye.

15. A method for dyeing a textile composite, the method comprising:
coating at least a portion of a first surface of a sublayer with a solid sublimation dye;
incorporating the sublayer containing the solid sublimation dye into the textile composite, the textile composite comprising at least a first layer adjacent the first surface of the sublayer; and
activating the solid sublimation dye to a gas sublimation dye that permeates the first layer from the first surface of the sublayer and solidifies within the first layer,
wherein incorporating the sublayer into the textile composite comprises laminating the first layer to the first surface of the sublayer, the solid sublimation dye disposed between the first layer and the face layer, and
wherein laminating the first layer to the first surface comprises pattern bonding the first layer to the first surface to create depressed surface areas and elevated surface areas in the laminate, solid sublimation dye activated during lamination proceeds into the elevated surface areas.

16. The method of claim 14, wherein laminating the first layer to the first surface comprising area bonding the first layer to the first surface, solid sublimation dyes disposed in bonding areas of the sublayer release from the first surface before the first layer and the first surface are joined by area bonding.

17. A method for forming a textile composite, the method comprising:
coating at least a portion of a first surface of a sublayer with a first solid sublimation dye and at least a portion of a second surface of the sublayer with a second solid sublimation dye, the second surface opposite the first surface;
laminating a first layer to the first surface and a second layer to the second surface; and
activating the first solid sublimation dye to a first gas sublimation dye that permeates the first layer from the first surface of the sublayer and solidifies within the first layer and the second solid sublimation dye to a second gas sublimation dye that permeates the second layer from the second surface of the sublayer and solidifies within the second layer.

18. The method of claim 17, wherein coating further comprises coating the first surface with a first plurality of solid sublimation dyes arranged in a first pattern and the second surface with a second plurality of solid sublimation dyes arranged in a second pattern, the first pattern different than the second pattern.

19. The method of claim 17, wherein laminating further comprises stitching-bonding the first layer and the second layer to the sublayer.

20. The method of claim 17, wherein laminating further comprises needle-punching the first layer and the second layer to the sublayer.

21. The method of claim 17, wherein:
the sublayer comprises a low melt layer; and
laminating the first layer and the second layer to the sublayer comprises applying heat and pressure sufficient to melt the sublayer and to activate the first sublimation dye and the second sublimation dye.

22. The method of claim 17, wherein:
the method further comprises placing a first separate carrier sheet containing at least one first additional solid sublimation dye against the first layer opposite the first surface and a second separate carrier sheet containing at least one second additional solid sublimation dye against the second layer opposite the second surface; and activating the solid sublimation dye to the gas sublimation dye further comprises activating each first additional solid sublimation dye to a first additional gas sublimation dye and each second additional solid sublimation dye to a second additional gas sublimation dye simultaneously with the activation of first and second solid sublimation dyes.

23. The method of claim 17, wherein the method further comprises embossing the textile composite with a three-dimensional pattern.

24. The method of claim 23, wherein embossing the textile composite occurs simultaneously with activating the first and second solid sublimation dyes.

25. The method of claim 17, wherein activating the first solid sublimation dye and the second solid sublimation due comprises heating the textile composite or heating and applying pressure to the textile composite.

26. The method of claim 12, wherein:
the method further comprises placing a separate carrier sheet containing at least one additional solid sublimation dye against the first layer opposite the first surface of the sublayer; and
activating the solid sublimation dye to the gas sublimation dye further comprises activating the additional solid sublimation dye to an additional gas sublimation dye simultaneously with the activation of solid sublimation dyes on the first surface.

27. The method of claim 12, wherein:
the textile composite comprises a second layer adjacent a second surface of the sublayer opposite the first surface;
the method further comprises coating at least a portion of the second surface of the sublayer with at least one additional solid sublimation dye; and
activating the solid sublimation dye to the gas sublimation dye further comprises activating the additional solid sublimation dye on the second surface to an additional gas sublimation dye simultaneously with the activation of solid sublimation dye on the first surface.

28. The method of claim 13, wherein:
the method further comprises placing a separate carrier sheet containing at least one additional solid sublimation dye against the first layer opposite the first surface of the sublayer; and
activating the solid sublimation dye to the gas sublimation dye further comprises activating the additional solid sublimation dye to an additional gas sublimation dye simultaneously with the activation of solid sublimation dyes on the first surface.

29. The method of claim 13, wherein:
the textile composite comprises a second layer adjacent a second surface of the sublayer opposite the first surface;
the method further comprises coating at least a portion of the second surface of the sublayer with at least one additional solid sublimation dye; and
activating the solid sublimation dye to the gas sublimation dye further comprises activating the additional solid sublimation dye on the second surface to an additional gas sublimation dye simultaneously with the activation of solid sublimation dye on the first surface.

30. The method of claim 14, wherein:
the method further comprises placing a separate carrier sheet containing at least one additional solid sublimation dye against the first layer opposite the first surface of the sublayer; and
activating the solid sublimation dye to the gas sublimation dye further comprises activating the additional solid sublimation dye to an additional gas sublimation dye simultaneously with the activation of solid sublimation dyes on the first surface.

31. The method of claim 14, wherein:
the textile composite comprises a second layer adjacent a second surface of the sublayer opposite the first surface;
the method further comprises coating at least a portion of the second surface of the sublayer with at least one additional solid sublimation dye; and
activating the solid sublimation dye to the gas sublimation dye further comprises activating the additional solid sublimation dye on the second surface to an additional gas sublimation dye simultaneously with the activation of solid sublimation dye on the first surface.

32. The method of claim 15, wherein:
the method further comprises placing a separate carrier sheet containing at least one additional solid sublimation dye against the first layer opposite the first surface of the sublayer; and
activating the solid sublimation dye to the gas sublimation dye further comprises activating the additional solid sublimation dye to an additional gas sublimation dye simultaneously with the activation of solid sublimation dyes on the first surface.

33. The method of claim 15, wherein:
the textile composite comprises a second layer adjacent a second surface of the sublayer opposite the first surface;
the method further comprises coating at least a portion of the second surface of the sublayer with at least one additional solid sublimation dye; and
activating the solid sublimation dye to the gas sublimation dye further comprises activating the additional solid sublimation dye on the second surface to an additional gas sublimation dye simultaneously with the activation of solid sublimation dye on the first surface.

* * * * *